United States Patent [19]

Ishimura et al.

[11] Patent Number: 5,895,718

[45] Date of Patent: Apr. 20, 1999

[54] THERMOPLASTIC RESIN COMPOSITIONS AND TEMPERATURE-DEPENDENT SHAPE-TRANSFORMABLE/FIXABLE PRODUCTS MAKING USE OF THE SAME

[75] Inventors: Naoya Ishimura, Aichi-ken; Kuniyuki Senga, Kasugai; Kyoji Aoyama, Aich-ken; Tsutomu Tomatsu, Nagoya, all of Japan

[73] Assignee: The Pilot Ink Co., Ltd., Aichi-ken, Japan

[21] Appl. No.: 08/839,707

[22] Filed: Apr. 15, 1997

[30] Foreign Application Priority Data

| Apr. 19, 1996 | [JP] | Japan | 8-122167 |
| Aug. 6, 1996 | [JP] | Japan | 8-224451 |
| Oct. 24, 1996 | [JP] | Japan | 8-301256 |
| Nov. 7, 1996 | [JP] | Japan | 8-313076 |

[51] Int. Cl.$^6$ .................................. C08F 20/00
[52] U.S. Cl. .................. 525/437; 525/418; 525/423; 525/452; 525/461; 528/176; 528/193; 528/194; 528/196; 528/271; 528/272; 528/332
[58] Field of Search .................. 525/423, 418, 525/461; 528/176, 193, 194, 196, 271, 272, 332

[56] References Cited

U.S. PATENT DOCUMENTS

| 4,845,162 | 7/1989 | Schmitt et al. ............ 525/423 |
| 5,304,606 | 4/1994 | Yamamoto ................. 525/210 |
| 5,318,813 | 6/1994 | Flexman, Jr. ............... 428/36.9 |
| 5,408,002 | 4/1995 | Coleman et al. ............ 525/204 |
| 5,506,300 | 4/1996 | Ward et al. ................. 525/88 |

FOREIGN PATENT DOCUMENTS

| 0 242 874 | 10/1987 | European Pat. Off. . |
| 0 390 060 | 10/1989 | European Pat. Off. . |
| 0 410 415 | 1/1991 | European Pat. Off. . |
| 0 454 173 | 10/1991 | European Pat. Off. . |
| 342762 | 11/1992 | Japan . |

*Primary Examiner*—Terressa Mosley
*Attorney, Agent, or Firm*—Fitzpatrick, Cella, Harper & Scinto

[57] ABSTRACT

A thermoplastic resin composition comprising a thermoplastic resin (A) and a thermoplastic polymer (B) having a glass transition temperature within the range of from −20° C. to 70° C. which are melt-blended in a proportion (A)/(B) of from 95/5 to 20/80 in weight ratio. The composition, upon application of an external stress in a temperature region of from a temperature about the glass transition temperature of the thermoplastic polymer (B) to the melting point thereof, is transformable to any shape that conforms to that stress, and is capable of becoming fixed to the transformed shape in a temperature region lower than the glass transition temperature.

The composition can be used to provide a temperature-dependent shape-transformable/fixable product formed of the above composition.

20 Claims, No Drawings

THERMOPLASTIC RESIN COMPOSITIONS AND TEMPERATURE-DEPENDENT SHAPE-TRANSFORMABLE/FIXABLE PRODUCTS MAKING USE OF THE SAME

BACKGROUND OF THE INVENTION

1. Field of the Invention

This invention relates to a thermoplastic resin composition and a temperature-dependent shape-transformable/fixable (i.e., shape-transformable and shape-fixable) product (e.g., molded product) making use of the same. More particularly, it relates to a thermoplastic resin composition prepared by melt-blending a thermoplastic resin and a thermoplastic polymer having a glass transition temperature within a specific temperature range, being transformable to any desired shapes upon application of an external stress in a suitable temperature region higher than a temperature about the glass transition temperature, and having the function to become fixed to the transformed shape in a temperature region lower than the glass transition temperature; and a temperature-dependent shape-transformable/fixable product obtained using such a composition.

2. Description of the Related Art

Shape memory resins comprised of a single resin such as polynorbornene polymer or styrene-butadiene copolymer and shape memory resins comprised of a composite resin obtained by blending trans-form polyisoprene resin with polyolefin resin are known in the art.

Some proposals are also disclosed with regard to temperature-dependent shape-transformable resin compositions that are caused to transform in a temperature range higher than glass transition temperature and become fixed to the transformed shape upon cooling. For example, U.S. Pat. No. 4,891,409 discloses a single-phase shape-transformable elastomer compound comprised of a crystalline polymer and an elastomer polymer which are homogeneously mutually melted, having a single and overall glass transition temperature.

Now, those comprised of polynorbornene polymer are high-molecular compounds having about millions of molecular weight, and have a difficulty in moldability for injection molding or the like, having limitations on their use. Moreover, they have shape memory temperatures specific to such polymers, and can not be set at a variety of temperatures adapted to purposes.

Those of the styrene-butadiene copolymer type have limitations on their use because of a relatively high shape memory temperature (about 60–90° C.) and poor thermal properties.

Those of the combination type comprised of polyolefin resin and trans-form polyisoprene resin are those which are caused to transform at a temperature higher than the melting point of the polyisoprene resin to bring out shape memory performance, thus they are necessarily shape-transformable only in a high temperature region.

The one disclosed in U.S. Pat. No. 4,891,409 is a single-phase temperature-dependent shape-transformable resin composition obtained by mutually melting a crystalline polymer and an elastomer polymer. When this composition is made into molded products and the molded products are left to stand in contact, they may stick together to become separable with difficulty. This is not preferable for their handling or storage at the stage of manufacture. Also, the proportion of crystallization and the degree of cross-linking, i.e., the formation of a three-dimensional network affects the relative readiness in shape transformation and the degree of its restoration, and delicate control therefor must be taken into account. Thus, not only the freedom of function setting is restricted but also difficulties may arise such that the function of elongation and elastic restoration is prohibited by the cross-linking.

SUMMARY OF THE INVENTION

The present invention will eliminate such difficulties involved in the conventional temperature-dependent shape-transformable/fixable materials.

Accordingly, an object of the present invention is to provide a thermoplastic resin composition that makes it possible to preset functions adapted to purposes and also to obtain, e.g., molded products with any desired shape and size by conventional general-purpose molding means, and that, upon application of an external stress in a temperature region of room temperature or temperature slightly higher than that, is transformable to any shapes that conform to that stress and, upon cooling, can become fixed to such shapes; and a temperature-dependent shape-transformable/fixable product obtained using such a composition. As a specific example, it may include a fiber material for doll hair (the hair of the head of a doll) that satisfies a shape-transformability of the hair.

As conventional fiber materials for doll hair, synthetic resins such as vinylidene chloride resins, vinyl chloride resins, polyamide and polyropylene are commonly used. In the case of the hair making use of the fiber of this type, it must be handled at a temperature higher than the melting point of the fiber and also using a special tool before the hair style can be transformed. Thus, e.g., infants can not curl the hair to play with at will. In an attempt to obtain fibrous extruded products by utilizing the low-temperature shape-transformable composition disclosed in U.S. Pat. No. 4,891,409, it is difficult to continuously extrude such a composition. If it is possible to continuously extrude it, the fibers may join one another when left to stand in close contact, and may function as doll hair with difficulty.

With extensive studies made under such circumstances, another object of the present invention is to provide a shape-transformable fiber for doll hair with use of which the hair style can be transformed at will in a temperature region of from room temperature to 70° C., and preferably in a temperature region of from 30° C. to 60° C., the transformed hair style can be fixed when left to stand naturally or cooled, or optionally the fixed hair style can be restored to the original condition or further transformed to different hair styles as having repeatedly transformable and restorable functions and durability, and even infants can readily transform the hair style to play with.

A still another object of the present invention is to provide a stress memory thermoplastic resin composition that is elastically transformable to any shape upon application of a deforming stress, fixable to the transformed shape, and capable of exhibiting an elastic stress in the fixed shape to restore the original shape, all in daily-life temperature regions; and a stress memory temperature-dependent shape-transformable/fixable product obtained using the composition.

To achieve the above objects, the present invention provides a thermoplastic resin composition comprising at least one thermoplastic resin (A) and at least one thermoplastic polymer (B) having a glass transition temperature within the range of from −20° C. to 70° C. which are melt-blended in a proportion (A)/(B) of from 95/5 to 20/80 in weight ratio.

As a preferred embodiment of the above composition, the present invention provides a thermoplastic resin composition comprising at least one thermoplastic resin (A) and at least one thermoplastic polymer (B) having a glass transition temperature within the range of from −20° C. to 70° C. which are melt-blended in a proportion (A)/(B) of from 95/5 to 20/80 in weight ratio; the composition, upon application of an external stress in a temperature region of from a temperature about the glass transition temperature of the thermoplastic polymer (B) to the melting point thereof, being transformable to any shape that conforms to that stress, and being capable of becoming fixed to the transformed shape in a temperature region lower than the glass transition temperature.

The present invention also provides a stress memory thermoplastic resin composition comprising a thermoplastic elastomer (a) and a thermoplastic polymer (B) having a glass transition temperature within the range of from −20° C. to 70° C. which are melt-blended in a proportion (a)/(B) of from 0.5/1 to 10/1 in weight ratio; the composition, upon application of a deforming stress in a temperature region of from a temperature about the glass transition temperature of the thermoplastic polymer (B) to the melting point thereof, being elastically transformable to any shape that conforms to that stress, being fixable to the transformed shape in a temperature region lower than the glass transition temperature, and being capable of exhibiting an elastic stress in a temperature region higher than the glass transition temperature to restore the original shape from the fixed shape.

As a preferred embodiment of the above composition, the present invention further provides a stress memory thermoplastic resin composition which is, upon application of an external force in a temperature region higher than a temperature about the glass transition temperature of the thermoplastic polymer (B), capable of undergoing elastic elongation to become transformed to the shape that conforms to that external force, and exhibits an elastic contraction stress which is a reaction force of the stress of the elastic elongation, in a temperature region lower than the glass transition temperature to release the transformed shape to restore the original shape.

The present invention still also provides a temperature-dependent shape-transformable/fixable product comprising a thermoplastic resin composition comprising at least one thermoplastic resin (A) and at least one thermoplastic polymer (B) having a glass transition temperature within the range of from −20° C. to 70° C. which are melt-blended in a proportion (A)/(B) of from 95/5 to 20/80 in weight ratio; the product, upon application of an external stress in a temperature region of from a temperature about the glass transition temperature of the thermoplastic polymer (B) to the melting point thereof, being transformable to any shape that conforms to that stress, and being capable of becoming fixed to the transformed shape in a temperature region lower than the glass transition temperature.

The present invention further provides a stress memory temperature-dependent shape-transformable/fixable product comprising a thermoplastic resin composition comprising a thermoplastic elastomer (a) and a thermoplastic polymer (B) having a glass transition temperature within the range of from −20° C. to 70° C. which are melt-blended in a proportion (a)/(B) of from 0.5/1 to 10/1 in weight ratio; the product, upon application of a deforming stress in a temperature region of from a temperature about the glass transition temperature of the thermoplastic polymer (B) to the melting point thereof, being elastically transformable to any shape that conforms to that stress, being fixable to the transformed shape in a temperature region lower than the glass transition temperature, and being capable of exhibiting an elastic stress in a temperature region higher than the glass transition temperature to restore the original shape from the fixed shape.

As a preferred embodiment of the above product, the present invention further provides a stress memory temperature-dependent shape-transformable/fixable product which is, upon application of an external force in a temperature region higher than a temperature about the glass transition temperature of the thermoplastic polymer (B), capable of undergoing elastic elongation to become transformed to the shape that conforms to that force, is fixable to the transformed shape in a temperature region lower than the glass transition temperature while holding as memory the elastic contraction stress which is a reaction force of the stress of the elastic elongation, and is capable of exhibiting the elastic contraction stress in a temperature region higher than the glass transition temperature to release the fixed shape to restore the original shape.

In the above temperature-dependent shape-transformable/fixable product, the present invention still further provides a fiber for doll hair, comprising a thermoplastic resin composition comprising at least one thermoplastic resin (A) and at least one thermoplastic polymer (B) having a glass transition temperature within the range of from 0° C. to 70° C. which are melt-blended in a proportion (A)/(B) of from 95/5 to 20/80 in weight ratio, and comprising a filament having an external diameter of from 30 μm to 200 μm.

The above and other objects, features and advantages of the present invention are described in or will become apparent from the following description of the preferred embodiments.

DESCRIPTION OF THE PREFERRED EMBODIMENTS

The present invention is characterized by a temperature-dependent shape-transformable/fixable material comprising a thermoplastic resin (A) and a thermoplastic polymer (B) having a specific glass transition temperature which are melt-blended in a specific proportion, whereby it can have properties of being transformable to any shape in a specific temperature region and the function to become fixed to the transformed shape in a specific temperature region, which can not be attained by either the thermoplastic resin (A) or the thermoplastic polymer (B) used alone, and also it can be shape-transformed/fixed with greater ease at a temperature within a daily-life temperature range or by a heating and cooling means of everyday usage, and still also the shape thus fixed can be released in a temperature region higher than the glass transition temperature so as to be shape-transformed and shape-fixed to any other desired shapes, having a durability high enough to withstand repeated practical use.

In the thermoplastic resin composition or temperature-dependent shape-transformable/fixable product of the present invention, the thermoplastic polymer (B) has a rigidity in a temperature region lower than its glass transition temperature but changes to have a viscoelasticity at a temperature higher than its glass transition temperature to cause a decrease in flexural modulus, to bring about a relative decrease in rigidity and flexural modulus of the originally rigid, thermoplastic polymer (B), so that the composition or product becomes transformable to any desired shapes upon application of an external stress and the transformed shape is fixed as a result of restoration of the thermoplastic polymer (B) to the original rigidity in a temperature region lower than its glass transition temperature. Here, in order to maintain the function described above, it is preferable to use a thermoplastic elastomer (herein often "thermoplastic elastomer (a)") as the thermoplastic resin (A) and it is effective to use it in combination with the thermoplastic polymer (B) selected from non-crystalline thermoplastic polymers.

In the combination of the thermoplastic resin (A) with the thermoplastic polymer (B), a combination of resins having chemical structures different from each other is preferred because the above function can be effectively attained. If resins having like chemical structures, i.e., resins having like properties are used in combination, a homogeneous mutual melt is formed and the viscoelasticity brought by the thermoplastic polymer (B) at a temperature higher than its glass transition temperature is exhibited without any proper control by the thermoplastic resin (A), and hence, when, e.g., molded products are left to stand overlaid, they tends to stick together. Meanwhile, such a combination also results in a relative lowering of the function of shape-fixing in the temperature region lower than the glass transition temperature.

The thermoplastic resin (A) may include polymers selected from any of polyamide resins such as nylon 6, nylon 6/6, nylon 12, nylon 6/9, nylon 6/12, a nylon 6-6/6 copolymer, a nylon 6-12 copolymer, a nylon 6-6/6-12 copolymer and a nylon 6-9-12 copolymer, polyester resins such as polyethylene terephthalate and polybutylene terephthalate, acrylonitrile-styrene copolymer resins, acrylonitrile-butadiene-styrene copolymer resins, polycarbonate resins, vinylidene chloride-vinyl chloride copolymer resins, copolymer acrylonitrile resins, polyamide type thermoplastic elastomers such as polyamide-polyester block copolymer resins, styrene type thermoplastic elastomers such as styrene-butadiene block copolymer resins, polyolefin type thermoplastic elastomers such as polypropylene-ethylene propylene rubber block copolymer resins, polybutadiene type thermoplastic elastomers, polyester type thermoplastic elastomers, polyurethane type thermoplastic elastomers, and thermoplastic elastomers such as ethylene-vinyl acetate copolymers.

The composition or product of the present invention can be effectively shape-transformed when treated in a temperature region higher than the glass transition temperature and lower than the softening point or melting point of the thermoplastic resin (A) or thermoplastic polymer (B), preferably at a temperature of 100° C. or below, and more preferably in a temperature region of from 35° C. to 80° C.

The thermoplastic polymer (B) may include saturated polyester resins, acrylate resins, methacrylate resins, vinyl acetate resins, polyamide resins, epoxy resins (uncured products), hydrocarbon resins, soft vinyl chloride resins, ethylene-vinyl acetate copolymer resins, vinyl chloride-vinyl acetate copolymer resins, vinyl chloride-acrylate copolymer resins, styrene resins, and acrylate-styrene copolymer resins.

Of the resins listed above, saturated polyester resins, acrylic resins, vinyl acetate resins, vinyl chloride-vinyl acetate copolymer resins and styrene resins may preferably be used.

The thermoplastic polymer (B) may be selected from those having a glass transition temperature of from −20° C. to 70° C., preferably from −5° C. to 65° C., more preferably from 20° C. to 65° C., and still more preferably from 30° C. to 60° C.

The thermoplastic polymer (B) having a glass transition temperature within the above range may be selected, whereby the composition or product can be shape-transformed at a temperature within the daily-life temperature range or a temperature region around it, i.e., at an environmental temperature of from 35° C. to 80° C., by means of an appropriate tool or fingers, and its shape can be fixed to the transformed shape in a temperature region lower than the shape-transformation temperature, which may be fixed in a temperature region of from about 30° C. to about −5° C. This is effective for its use in toys.

As means for heating or cooling, freezers or refrigerators may be used, or the body temperature of hands or fingers or heating mediums such as hot water may bemused. It may also include hot-air devices employing electrification resistance heaters as heat sources, box type heating devices, curling irons or appropriate shaping tools, ice pieces or various regenerating mediums, cold-air devices having a Peltier element as a cooling and heating source, box type cooling devices, and shaping tools for various shapes, any of which may be used according to purposes.

The thermoplastic resin (A) and the thermoplastic polymer (B) may be blended in a proportion (A)/(B) of from 95/5 to 20/80 in weight ratio, as effective proportion, and preferably from 95/10 to 50/50. Viscosity may increase with an increase in the weigh of the thermoplastic polymer (B). If it is more than 80% by weight, the composition may become so much viscous to cause a stickiness, causing a difficulty that molded products may stick together when left to stand in close contact. If on the other hand it is less than 5% by weight, the action attributable to a decrease in flexural modulus at the time of shape-transformation may be insufficient and the viscoelasticity can not be well exhibited, making it difficult to achieve the intended shape-transformation.

Here, the thermoplastic resin (A) and the thermoplastic polymer (B) may each be used alone or in combination of a plurality of resins or polymers.

The thermoplastic resin composition of the present invention can be made into molded products by injection molding, extrusion or any other conventional methods.

As a form of the product of the present invention, the thermoplastic resin composition of the present invention may of course be dissolved in a solvent or dispersed in a vehicle, followed by coating on a support to form a coating. Such a coating also exhibits the effect of shape-transformation and shape-fixation, and hence, when used in combination with a stress-transformable support, the support itself exhibits a harmonious behavior.

In the shape-transformation/fixation behavior of the thermoplastic resin composition of the present invention and the product formed using it, the thermoplastic resin (A) undergoes no change in its properties and also has a viscosity appropriately controlled, when transformed into a viscoelastic state at a temperature higher than the glass transition temperature of the thermoplastic polymer (B). Thus, it contributes to preventing troubles caused by products which may stick together when stand in close contact.

Here, when treated for shape-transformation, the product can be readily shape-transformed by bending to a desired shape without causing any change in original size, and also can be shape-transformed/fixed by stretching or pressing to cause a change in original size.

As a special example, a system in which the thermoplastic resin (A) has a glass transition temperature of from −20° C. to 70° C. or a system in which the thermoplastic resin (A)

is an elastomer and only the thermoplastic polymer (B) has glass transition temperature can be endowed with the shape-transformability even in a temperature region lower by 10 to 20° C. than the glass transition temperature of the thermoplastic polymer (B) when the both are blended.

The thermoplastic resin composition of the present invention and the product formed using it have shape memory properties, and can be made to exhibit a shape memory performance of restoring an appropriate original form upon heating or cooling.

Of course, the shape memory performance refers to a shape memory performance in which a product is heated to about its melt temperature and fixed to have a desired shape followed by cooling to give an initial shape, and then heated to a shape-transformable temperature lower than the melt temperature to give a different shape followed by cooling, whereupon the shape is fixed, and is naturally restored to the initial shape when again heated.

The thermoplastic resin composition of the present invention can be used to provide a fiber for doll hair as described below.

The fiber for doll hair of the present invention comprises a thermoplastic resin composition comprising at least one thermoplastic resin (A) and at least one thermoplastic polymer (B) having a glass transition temperature within the range of from 0° C. to 70° C. which are melted into an integral form in a proportion (A)/(B) of from 95/5 to 20/80 in weight ratio; the fiber, upon application of an external stress in a temperature region of from a temperature about the glass transition temperature of the thermoplastic polymer (B) to the melting point thereof, being transformable to any shape that conforms to that stress, and becoming fixed to the transformed shape in a temperature region lower than the glass transition temperature.

In the foregoing, the form of the fiber "melted into an integral form" may include a form in which the thermoplastic resin (A) and the thermoplastic polymer (B) are melt-blended, and forms of composite fiber such as a core/sheath type in which the thermoplastic polymer (B) forms a core and the thermoplastic resin (A) surround and join it in the form of a sheath and a joining type in which the components (A) and (B) are joined in parallel.

In the embodiment described above, the thermoplastic resin (A) may be the thermoplastic elastomer (a), preferably comprising a polyamide elastomer, and the thermoplastic polymer (B) may be a saturated polyester resin having a glass transition temperature of from 0° C. to 50° C., which may preferably be in a proportion (a)/(B) (polyamide elastomer/saturated polyester resin) of from 80/20 to 30/70 in weight ratio, and more preferably from 50/50 to 70/30. When the proportion is specified to the above range, the high strength, feel, appropriate moisture absorption inherent in the polyamide itself can be properly exhibited, where a similarity to the hair of the head can be satisfied and also the intended shape-transformation/fixing performance can be effectively exhibited. Also, such similarity and shape-transformation/fixing performance can be stably maintained with time.

The fiber for doll hair is constituted of filaments, which are produced usually in the form of multi-filaments by melt spinning using a melt-spinning apparatus. This is because a bundle of fiber can be made up in the form that enables easy continuous hair setting in the head of a doll by means of a hair setting machine.

Here, individual filaments may have round cross sections but not limited thereto, and those having star-like, Y-shaped or other irregular cross sections may be effective, any of which may be selected according to feel, bulkiness, curl workability and so forth.

The individual filaments may have an external diameter of from 30 to 200 μm, and more preferably from 40 to 120 μm. Those having a diameter smaller than 30 μm are too thin to ensure a good curl retention. On the other hand, those having a diameter larger than 200 μm are too thick to have the nature of hair with ease.

Of the resins described above, resins generally used for forming fibers and having a melting point or softening point of 100° C. or above are effective because they can maintain a proper rigidity to contribute to form retention.

To maintain the initial flexible softness over a long period of time, it is preferable to use the thermoplastic elastomer. When the thermoplastic elastomer is used, the product can be prevented from loosing flexibility to become hard with time.

Of the thermoplastic polymer (B), polymers having a glass transition temperature of from 0° C. to 70° C., preferably from 5° C. to 65° C., more preferably from 20° C. to 65° C., and still more preferably from 30° C. to 50° C., are effective. In particular, saturated polyester resins, acrylic resins, vinyl chloride-vinyl acetate copolymer resins and styrene resins are preferred.

Selection of a thermoplastic polymer (B) having a glass transition temperature within the above range makes it possible to obtain doll hair which is transformable to any desired hair style at a temperature within the daily-life temperature or about that temperature by the use of any conventionally known various hair style transforming tools and has the function to retain the transformed hair style upon cooling, thus infants or the like can readily change hair style to play with.

In the fiber for doll hair of the present invention, the thermoplastic resin (A) maintains the properties of resin itself also when turned viscoelastic at a temperature higher than the glass transition temperature of the thermoplastic polymer (B), and appropriately controls the viscosity to contribute to preventing the troubles caused when products stand in close contact with one another.

Besides the small-diameter filaments for the hair of the head, large-diameter filaments may also be put into practical used, which are suitable for use in setting them to the surfaces of toy dolls or toy animals and function as artificial hair for the hair of the body and the hair of the head.

The individual filaments of the large-diameter filaments may have an external diameter of from 0.2 to 3.0 mm, and more preferably from 0.5 to 2 mm. Those having a diameter smaller than 0.2 μm must be set in a large number to require much time and labor in manufacture. Also, when hot water or cold water is used as heating means or cooling means, water content tends to be held between hairs to make them difficult to dry. On the other hand, those having a diameter larger than 3 mm are too thick to have the nature of artificial hair.

The thermoplastic resin composition of the present invention can also be used as a stress memory thermoplastic resin composition, and can be used to provide a stress memory temperature-dependent shape-transformable/fixable product, as described below.

The stress memory thermoplastic resin composition of the present invention comprises the thermoplastic elastomer (a) and the thermoplastic polymer (B) having a glass transition temperature within the range of from −20° C. to 70° C.

which are melt-blended in a proportion (a)/(B) of from 0.5/1 to 10/1 in weight ratio. In the combination of the thermoplastic elastomer (a) with the thermoplastic polymer (B), the combination may preferably be selected so that the state in which the components (a) and (B) are melt-blended is in a half mutually molten state, in order to repeatedly reversibly exhibiting the tensile elastic elongation and elastic contraction restoration which are required as functions of the present invention, i.e., in order to exhibit rubber-like elasticity and to repeatedly effect elongation and contraction.

In particular, it is especially effective to employ a combination wherein the thermoplastic elastomer (a) is a polyurethane elastomer and the thermoplastic polymer (B) is a saturated polyester resin or a combination wherein the thermoplastic elastomer (a) is a polyamide elastomer and the thermoplastic polymer (B) is an acrylic resin, i.e., acrylate resin. An ethylene-vinyl acetate copolymer, a crystalline polyester resin or the like may be optionally further used in combination.

The system formed by the above combination has the advantages that a great elastic elongation and a great elastic restoration can be achieved and the glass transition temperature can be selected in variety in accordance with purposes.

The composition formulated as described above can be made to function as a stress memory material having a tensile elastic elongation of 100% or more and having the function that, when the tensile elastic elongation is 100%, the shape fixed in an elongated state is restored to the original shape on account of an elastic contraction stress exhibited as 80% or more of elastic contraction restoration.

In the foregoing, the tensile elastic elongation is a displacement rate of elongation on the basis of the initial length, and is calculated according to the following expression (1).

Expression (1):

Tensile elastic elongation (%)=|amount of elongation displacement (mm)/initial length (mm)|×100

The elastic contraction restoration shows a degree of restoration to the initial length, and is calculated according to the following expression (2).

Expression (2):

Elastic contraction restoration (%)=|amount of contraction displacement (mm)/amount of elongation displacement (mm)|×100

In the combination of the thermoplastic elastomer (a) with the thermoplastic polymer (B), they may preferably be in a proportion (a)/(B) of from 0.8/1 to 5/1 in weight ratio, and more preferably in a proportion (a)/(B) of from 1.5/1 to 2.5/1 in weight ratio.

In a system where (a) is less than 0.8, the elastic elongation may be insufficient. On the other hand, in a system where it is more than 5, the product may lack in shape-fixability, tending to insufficiently have the function to put the desired stress into memory.

The thermoplastic resin composition according to the present invention and the product obtained using it may be optionally blended with a thermochromic material. As the thermochromic material, it is preferable to use a thermochromic material containing three components, an electron donating compound, an electron accepting compound and an organic compound medium capable of reversibly causing color-forming reaction. Stated specifically, it may include thermochromic materials disclosed in Japanese Patent Publications No. 51-35414, No. 51-44706 and No. 1-17154 (corresponding to U.S. Pat. No. 4,028,118 and No. 4,732,810), that is:

(1) a thermochromic material comprising as essential components three components, (a) an electron donating color-forming organic compound, (b) a compound having a phenolic hydroxyl group and (c) a chain aliphatic monohydric alcohol;

(2) a thermochromic material comprising as essential components three components, (a) an electron donating color-forming organic compound, (b) a compound having a phenolic hydroxyl group and (c) a compound selected from esters obtained from an aliphatic monohydric alcohol and an aliphatic monocarboxylic acid; and (3) a thermochromic material comprising as essential components three components, (a) an electron donating color-forming organic compound, (b) a compound having a phenolic hydroxyl group and (c) a compound selected from esters obtained from a higher aliphatic monohydric alcohol, an aliphatic monocarboxylic acid and a chain aliphatic monohydric alcohol.

It may also include the material disclosed in Japanese Patent Application Laid-open No. 7-186546 (U.S. Pat. No. 5,558,700), which is a thermochromic material formed of a mutual solution comprising as essential components three components, (a) an electron donating color-forming organic compound selected from a pyridine type, a quinazoline type and a bisquinazoline type, (b) a compound which is electron-acceptive to the electron donating color-forming organic compound and (c) a compound which is a reaction medium capable of reversibly causing electron-donating/accepting reaction attributable to the component (b) in a specific temperature region, and can form colors having high color-forming density and rich in brightness, such as yellow, yellowish orange, orange, reddish orange and red which are fluorescent at the time of color development.

It is also effective to use the material disclosed in Japanese Patent Publication No. 4-17154 (U.S. Pat. No. 4,720,301), which is proposed by the present applicant and is a temperature-sensitive metachromatic color memory thermochromic material that causes metachromatism showing great hysteresis characteristics, i.e., a metachromatic material of the type that causes metachromatism along such a course that the shape of a curve formed by plotting changes in coloring density caused by changes in temperature is greatly different between an instance where the temperature is raised from a lower-temperature side than a metachromatic temperature region and an instance where the temperature is raised inversely from a higher-temperature side than the metachromatic temperature, and is a thermochromic material having a characteristic feature that the state of a change made at a temperature not higher than a low-temperature metachromatic point or not lower than a high-temperature metachromatic point in a normal temperature region between the low-temperature metachromatic point and the high-temperature metachromatic point can be retained as memory.

It is also effective to use a highly sensitive thermochromic material proposed by the present applicant, having a hysteresis width of 3° C. or below with regard to the color density-temperature curve according to temperature changes, as disclosed in Japanese Patent Publication No. 1-293398.

The thermochromic material described above can be effective even when used as it is, and may most preferably be used by enclosing it in microcapsules because the thermochromic material can be kept to have the same composition under various use conditions and can have the same operation and effect.

When it is enclosed in microcapsules, a chemically and physically stable pigment composition can be made up. Practical utility can be satisfied when the microcapsules have a particle diameter ranging from 0.1 to 100 μm, and preferably from 2 to 30 μm.

The thermochromic material may be formed into such microcapsules by conventionally known methods such as interfacial polymerization, in situ polymerization, cure-in-liquid coating, phase separation from aqueous solution, phase separation from organic solvent, melt-diffusion cooling, air-suspension coating, and spray drying, any of which may be appropriately selected according to uses. Also, when put into practical use, the surfaces of the microcapsules may be endowed with durability according to purposes by forming secondary resin coatings thereon, or their surface properties may be modified.

The thermochromic material may be dispersed in a medium containing a binding agent that forms coating resin layers, and the dispersion obtained may be used as a coloring material such as an ink or a coating composition to form a reversibly thermochromic layer on a substrate by coating or spraying.

The thermochromic material may be contained in the coating resin layer in an amount of from 0.5 to 40% by weight, and preferably from 1 to 30% by weight. If it is mixed in an amount less than 0.5% by weight, a sharp thermochromic effect can be made visually seen with difficulty. If it is in an amount more than 40% by weight, it is in excess and may cause after-color in the color-extinguished state.

The reversibly thermochromic layer can be formed by conventionally known methods, e.g., by printing means such as screen printing, offset printing, gravure printing, coater printing, pad printing or transfer printing, or coating means such as brush coating, spray coating, electrostatic coating, electrodeposition coating, curtain coating, roller coating or dip coating.

The reversibly thermochromic layer described above may be incorporated with a non-thermochromic color dye or pigment in an appropriate quantity so that the thermochromic layer can be color-changed in variety. In an underlying layer of the reversibly thermochromic layer, images such as characters and patterns may be provided using the non-thermochromic color dye or pigment so that the images can be made to appear or disappear.

The metachromatic temperature of the thermochromic material and the temperature at which the composition or product of the present invention undergoes shape-transformation upon heating or cooling may be set at substantially the same temperature so that the shape-transformation and the color change can be synchronized. This is more effective as toy and decorative factors.

In the thermoplastic resin composition of the present invention, from 0.05 to 1.0 g of a usual pigment, from 1 to 20 g of a fluorescent pigment and from 10 to 100 g of a microcapsule pigment may be blended per 1 kg of the material resins to carry out molding to make up a colored material.

Conventional general-purpose light stabilizers, e.g., light stabilizers selected from ultraviolet light absorbers, antioxidants, anti-aging agents, singlet oxygen quenchers, ozone quenchers, visible light absorbers and infrared light absorbers may be appropriately mixed in the material resins to form filaments or provide on the surface a light-stabilizer layer in which the light stabilizer is incorporated in the binding agent.

Any of conventional general-purpose various plasticizers of, e.g., a phthalic acid type, an aliphatic dibasic acid ester type, a phosphate type, an epoxy type, a phenol type and a trimellitic acid type may be mixed in an amount of from 1 to 30% by weight so that the shape-transformable temperature can be made lower or a flexibility can be imparted. A conventional general-purpose flame retardant may also be mixed in an appropriate quantity.

Calcium carbonate, magnesium carbonate, titanium oxide, talc or other color pigment may be further added in order to improve workability, physical properties and so forth.

EXAMPLES

The thermoplastic resin composition of the present invention and the temperature-dependent shape-transformable/fixable product obtained using the composition will be described below in greater detail by giving Examples. The present invention is by no means limited by these Examples. In the following Examples, formulation is indicated as "part(s) by weight".

Example 1

400 parts of an ethylene-vinyl acetate copolymer resin (trade name: EVAFLEX P1407; available from Mitsui DuPont Chemical Co., Ltd.) as the thermoplastic resin (A), 200 parts of polyester resin (trade name: KEMIT R-251; available from Toray Industries, Inc.; glass transition temperature: 25° C.) as the thermoplastic polymer (B) and 1 part of a red pigment were mixed, and the mixture obtained was melt-blended at 170° C. by means of an extruder to obtain a thermoplastic resin composition.

The resin composition thus obtained was molded into tentacles of an octopus, each having a length of 15 cm, by means of an injection molder under conditions of a cylinder temperature of 180° C. to obtain a temperature-dependent shape-transformable/fixable molded product.

The molded product obtained was set in as tentacles of a molded product having the form of an octopus, to obtain a toy octopus.

The toy octopus was immersed in a hot-water bath kept at 35° C. or above, to transform the part of tentacles to a desired shape, and thereafter cooled with 10° C. water as it was in that shape, whereupon the transformed shape was fixed.

This change in shape was repeatable, as being shape-transformable at a temperature higher than the glass transition temperature and shape-fixable at a temperature lower than the glass transition temperature, substantially around the glass transition temperature 25° C. of the polyester resin. The fixed shape was retained at a temperature of 15° C. or below so long as no external force was applied.

Example 2

400 parts of a copolymer polyamide resin (trade name: DIAMID N1901; available from Daicel-Huels Ltd.) as the thermoplastic resin (A) and 200 parts of polyester resin (trade name: POLYESTER TP-217; available from Nippon Gosei Sangyo Co., Ltd.; glass transition temperature: 40° C.) as the thermoplastic polymer (B) were mixed, and the mixture obtained was melt-blended at 180° C. by means of an extruder to obtain a thermoplastic resin composition.

The resin composition thus obtained was molded into a rod of 2 mm in diameter by means of the extruder under conditions of a cylinder temperature of 180° C. to obtain a temperature-dependent shape-transformable/fixable molded product.

The molded product obtained was immersed in a 42° C. hot-water bath, whereupon the rod became soft, and it was possible to coil the rod around a cylinder of 2 cm diameter in the hot-water bath with ease. Then, as it was, the rod was cooled with 20° C. water, and thereafter the cylinder was pulled out. Even thereafter, the shape of a coiled spring stood fixed, and its shape was retained so long as no external force was applied.

When it was again immersed in a hot-water bath kept at 42° C. or above, it became shape-transformable. Then, it was stretched straight and thereafter cooled with 20° C. water, whereupon it remained straight in the state of room temperature.

The above change in shape was repeatable, as being shape-transformable at about 42° C. or above and shape-fixable at about 30° C. or below, and it was possible to take the desired shapes.

This shape-transformation/fixation temperature switched while making a border substantially around the glass transition temperature of the polyester resin used.

Example 3

250 parts of polyhexamethylene terephthalate (melting point: 150° C.) as the thermoplastic resin (A) and 100 parts of vinyl acetate resin (trade name: DENKASAKNOL SN-10; available from Denki Kagaku Kogyo Kabushiki Kaisha; glass transition temperature: 29° C.) as the thermoplastic polymer (B) were mixed, and the mixture obtained was melt-blended at 170° C. by means of an extruder to obtain a thermoplastic resin composition.

The resin composition thus obtained was molded into a sheet-like temperature-dependent shape-means of transformable/fixable molded product of 0.5 mm thick by the extruder at 180° C.

The sheet-like molded product obtained was cut into ribbons of 3 cm wide, and then folded in the form of waves at intervals of 3 cm in a 35° C. hot-water bath, followed by cooling with 20° C. water as they were in that shape, whereupon the ribbons became fixed to the shape of bellows. This shape was retained when stood under a temperature condition of room temperature 25° C., so long as no external force was applied.

The above shape-transformation/fixation was repeatable, as being shape-transformable at about 35° C. or above and shape-fixable at about 25° C. or below.

Example 4

300 parts of a copolymer polyamide resin (trade name: DIAMID N1901; available from Daicel-Huels Ltd.) as the thermoplastic resin (A) and 150 parts of polyester resin (trade name: ELITEL UE-3250; available from Unichika, Ltd.; glass transition temperature: 40° C.) as the thermoplastic polymer (B) were mixed, and the mixture obtained was melt-blended at 190° C. by means of an extruder to obtain a thermoplastic resin composition.

Using a general-purpose melt spinning machine, the resin composition thus obtained was spinned at 190° C. out of a die having 24 orifices, followed by drawing to obtain drawn yarn of about 80 μm diameter (single strand) as a temperature-dependent shape-transformable/fixable molded product.

The drawn yarn was wound around a cylinder, and then heated in a 45° C. oven for 3 minutes. This was subsequently left to stand at room temperature of 25° C., and thereafter the cylinder was pulled out, whereupon drawn yarn transformed into a cylindrical shape having the same inner diameter as the outer diameter of the cylinder was obtained.

The drawn yarn thus transformed was stretched straight and fixed as it was, which was then heated in a 45° C. oven for 3 minutes, and thereafter the product was taken out and left to stand at room temperature, whereupon it remained fixed straight.

The above shape-transformation/fixation was repeatable, as being shape-transformable at about 45° C. or above and shape-fixable at about 25° C. or below.

Example 5

300 parts of polybutylene terephthalate modified with 35 mol % of isophthalic acid (melting point: 168° C.) as the thermoplastic resin (A) and 150 parts of acrylic resin (trade name: DIANAL BR-117; available from Mitsubishi Rayon Co., Ltd.; glass transition temperature: 35° C.) as the thermoplastic polymer (B) were mixed, and the mixture obtained was melt-blended at 180° C. by means of an extruder to obtain a thermoplastic resin composition.

The resin composition thus obtained was molded into a rod of 2 mm in diameter by means of the extruder under conditions of a cylinder temperature of 190° C. to obtain a temperature-dependent shape-transformable/fixable molded product.

The molded product obtained was immersed in a 38° C. hot-water bath, whereupon the rod became soft, and it was possible to coil the rod around a cylinder of 2 cm diameter in the hot-water bath with ease. Then, as it was, the rod was cooled with 20° C. water, and thereafter the cylinder was pulled out. Even thereafter, the shape of a coiled spring stood fixed, and its shape was retained so long as no external force was applied.

When it was again immersed in a hot-water bath kept at 38° C. or above, it became shape-transformable. Then, it was stretched straight and thereafter cooled with 20° C. water, whereupon it remained straight at room temperature.

The shape-transformation at about 35° C. or above and shape-fixation at about 20° C. or below were repeatable, and it was possible to take the desired shapes.

This shape-transformation/fixation was achievable while making a border substantially around the glass transition temperature of the acrylic resin used.

Example 6

Preparation of reversibly thermochromic microcapsular pigment composition:

A reversibly thermochromic material comprised of 2 parts of 1,2-benzo-6-diethylaminofluorane, 6 parts of 1,1-bis(4-hydroxyphenyl)-n-octane and 50 parts of stearyl caprate was made into microcapsules by epoxy resin/amine interfacial polymerization to obtain a reversibly thermochromic microcapsular pigment composition. The pigment composition obtained was reversibly changeable to turn colorless at about 34° C. or above and turn pink at about 28° C. or below.

10 parts of a material obtained by drying and dehydrating the microcapsule pigment composition and 300 parts of the thermoplastic resin composition obtained in Example 4 were mixed, and the mixture obtained was melt-blended at 190° C. by means of an extruder to obtain a temperature-sensitive thermoplastic resin composition.

The resin composition thus obtained was reversibly changeable to turn colorless at about 34° C. or above and turn pink at about 28° C. or below.

Subsequently, this resin composition was molded into a rod of 2 mm in diameter by means of an extruder under conditions of a cylinder temperature of 190° C. to obtain a pink-colored temperature-dependent shape-transformable/ fixable molded product.

The pink molded product obtained was immersed in a 45° C. hot-water bath, whereupon the rod became soft and turned colorless, and it was possible to coil the rod around a cylinder of 2 cm in diameter in the hot-water bath with ease. Then, as it was, the rod was cooled with 20° C. water, whereupon it colored in pink and, as to the molded product coiled around the cylinder, the shape of a coiled spring stood fixed even after the cylinder was pulled out, and its shape was retained so long as no external force was applied.

When it was again immersed in a hot-water bath kept at 45° C. or above, it became shape-transformable and turned colorless. Then, it was stretched straight and thereafter cooled with 20° C. water, whereupon it colored in pink and at the same time remained straight in the state of room temperature.

The shape-transformation at about 45° C. or above and shape-fixation at about 30° C. or below were repeatable, and it was possible to take the desired shapes.

This shape-transformation/fixation was achievable while making a border substantially around the glass transition temperature of the polyester resin used.

Example 7

400 parts of a polyamide type thermoplastic elastomer (trade name: DIAMID E62; available from Daicel-Huels Ltd.) as the thermoplastic resin (A) and 300 parts of polyester resin (trade name: ELITEL UE-3215; available from Unichika, Ltd.; glass transition temperature: 45° C.) as the thermoplastic polymer (B) were mixed, and the mixture obtained was melt-blended at 190° C. by means of an extruder to obtain a thermoplastic resin composition.

Using a general-purpose melt spinning machine, the resin composition thus obtained was spinned at 190° C. out of a die having 24 orifices, followed by drawing to obtain drawn yarn of about 80 µm diameter (single strand) as a temperature-dependent shape-transformable/fixable molded product.

The drawn yarn was wound around a cylinder, and then heated in a 45° C. oven for 3 minutes. This was subsequently left to stand at room temperature of 25° C., and thereafter the cylinder was pulled out, whereupon drawn yarn transformed into a cylindrical shape having the same inner diameter as the outer diameter of the cylinder was obtained.

The drawn yarn thus transformed was stretched straight and fixed as it was, which was then heated in a 45° C. oven for 3 minutes, and thereafter the product was taken out and left to stand at room temperature, whereupon it remained fixed straight.

The above shape-transformation/fixation was repeatable, as being shape-transformable at about 50° C. or above and shape-fixable at about 30° C. or below.

Example 8

400 parts of a polyester elastomer (trade name: PELPRENE P-40H; available from Toyobo Co., Ltd.) as the thermoplastic resin (A) and 200 parts of polyester resin (trade name: POLYESTER TP-249; available from Nippon Gosei Sangyo Co., Ltd.; glass transition temperature: 36° C.) as the thermoplastic polymer (B) were mixed, and the mixture obtained was melt-blended at 200° C. by means of an extruder to obtain a thermoplastic resin composition, which was then molded into legs of a doll.

The molded product obtained was set in as legs of a doll to obtain a toy doll.

The toy doll was immersed in a 40° C. hot-water bath to transform the part of legs to a desired shape, and thereafter cooled with 20° C. water as it was in that shape, whereupon the transformed shape was fixed.

The above shape-transformation/fixation was repeatable, as being shape-transformable at about 40° C. or above and shape-fixable at about 25° C. or below.

Example 9

400 parts of a polyurethane elastomer (trade name: DESMOPAN 385; available from Bayer Japan Ltd.) as the thermoplastic resin (A) and 200 parts of polyester resin (trade name: ELITEL UE-3500; available from Unichika, Ltd.; glass transition temperature: 35° C.) as the thermoplastic polymer (B) were mixed, and the mixture obtained was melt-blended at 200° C. by means of an extruder to obtain a thermoplastic resin composition.

The resin composition thus obtained was molded into a rod of 2 mm in diameter by means of the extruder under conditions of a cylinder temperature of 200° C. to obtain a temperature-dependent shape-transformable/fixable molded product.

The molded product obtained was immersed in a 38° C. hot-water bath, whereupon the rod became soft, and it was possible to coil the rod around a cylinder of 2 cm diameter in the hot-water bath with ease. Then, as it was, the rod was cooled with 20° C. water, and thereafter the cylinder was pulled out. Even thereafter, the shape of a coiled spring stood fixed, and the shape of a spring was retained so long as no external force was applied.

When it was again immersed in a hot-water bath kept at 38° C. or above, it became shape-transformable. Then, it was stretched straight and thereafter cooled with 20° C. water, whereupon it remained straight at room temperature.

The shape-transformation at about 35° C. or above and shape-fixation at about 20° C. or below were repeatable, and it was possible to take the desired shapes.

This shape-transformation/fixation was achievable while making a border substantially around the glass transition temperature of the polyester resin used.

In the following, the fiber for doll hair of the present invention will be described in greater detail by giving Examples 10 to 12.

Example 10

300 parts of polybutylene terephthalate modified with 35 mol % of isophthalic acid (melting point: 168° C.) as the thermoplastic resin (A) and 150 parts of acrylic resin (trade name: DIANAL BR-117; available from Mitsubishi Rayon Co., Ltd.; glass transition temperature: 35° C.) as the thermoplastic polymer (B) were mixed, and the subsequent procedure in Example 4 was repeated to obtain fiber for doll hair.

The fiber obtained was wound on a cylindrical hair curler of 9 mm in diameter, and then heated in a 42° C. oven for 3 minutes. This was subsequently left to stand at room temperature of 25° C., and thereafter the curler was removed, whereupon hair fiber stood curled with the same inner diameter as the outer diameter of the curler, and this state was retained so long as no external force was applied.

The above shape-transformation took place at a temperature of 38° C., and the transformed shape became fixed upon leaving at a room temperature of 20° C. after the transformation. This shape-transformation/fixation was repeatable while making a border substantially around the glass transition temperature 35° C. of the acrylic resin.

Example 11

400 parts of a polyamide type thermoplastic elastomer (trade name: DIAMID E62; available from Daicel-Huels Ltd.) as the thermoplastic resin (A) and 300 parts of polyester resin (trade name: ELITEL UE-3500; available from Unichika, Ltd.; glass transition temperature: 30° C.) as the thermoplastic polymer (B) were mixed, and the mixture obtained was melt-blended at 190° C. by means of an extruder to obtain a thermoplastic resin composition.

Using a general-purpose melt spinning machine, the resin composition thus obtained was spinned at 190° C. out of a die having 20 orifices, followed by drawing to obtain multi-filaments comprised of 20 filaments of about 100 µm diameter each.

The multi-filaments were set in the head of a doll, and this head was joined to the body to make up a toy doll.

The above hair was wound on a hair curler of 9 mm in diameter, and then kept at a room temperature of 25° C. for 5 minutes as it was. Thereafter, the curler was removed, whereupon the hair stood curled with the same inner diameter as the outer diameter of the curler. This state was retained for about tens of minutes, and thereafter the curl was gradually released until it was restored to the original straight state after leaving for several hours to a day.

In the state the hair was wound on the curler, it was heated in a 35° C. oven for 3 minutes. This was subsequently left to stand at room temperature of 20° C., and thereafter the curler was removed, whereupon the hair stood curled with the same inner diameter as the outer diameter of the curler, and this shape was retained so long as no external force was applied.

Next, the curled hair was stretched straight and fixed to that shape by means of a fixing tool. This hair was again heated in a 35° C. oven and thereafter left to stand at room temperature of 20° C., and then the fixing tool was removed, whereupon the hair was restored to the initial straight state.

The hair curled at 35° C. was also left to stand at room temperature of from 25° C. to 30° C., whereupon it was naturally restored to substantially the original straight state after leaving for several hours to a day.

Example 12

Using a polyamide resin (trade name: RILSAN AMNO; available from Toray Industries, Inc.) as a sheath material and a saturated polyester resin (trade name: VYLON 103; available from Toyobo Co., Ltd.; glass transition temperature: 47° C.) as a core material in a weight ratio of 50/50, multi-filaments comprised of filaments each having a core/sheath structure and a diameter of 70 µm were obtained using a general-purpose composite-fiber spinning machine by spinning the materials at 200° C. out of a die having 8 orifices.

The multi-filaments were wound on a cylindrical hair curler of 9 mm in diameter, and then heated in a 50° C. oven for 3 minutes. This was subsequently left to stand at room temperature of 35° C. or below, and thereafter the curler was removed, whereupon the hair stood curled with the same inner diameter as the outer diameter of the curler, and this shape was retained so long as no external force was applied.

Next, the curled hair was stretched straight and fixed to that shape by means of a fixing tool. This hair was again heated in a 50° C. oven and thereafter left to stand at room temperature, and then the fixing tool was removed, whereupon the hair was restored to the initial straight state.

Even without use of the fixing tool, after the curled hair was heated in a 50° C. oven, it was restored to the straight state by combing or bushing the hair so as to be stretched.

The above shape-transformation/fixation was repeatable, as being shape-transformable at about 50° C. or above and shape-fixable at about 35° C. or below, and it was possible to take the desired shapes.

Examples will be given below in respect of artificial hair suitable for setting it to the surfaces of toys, used as artificial hair for the hair of the body and the hair of the head in toy dolls and toy animals.

Example 13

400 parts of a polyamide type thermoplastic elastomer (trade name: DIAMID E62; available from Daicel-Huels Ltd.) as the thermoplastic resin (A) and 300 parts of polyester resin (trade name: ELITEL UE-3500; available from Unichika, Ltd.; glass transition temperature: 30° C.) as the thermoplastic polymer (B) were mixed, and the mixture obtained was melt-blended at by means of an extruder to obtain a thermoplastic resin composition.

Using a general-purpose melt spinning machine, the resin composition thus obtained was spinned, followed by drawing to obtain filaments of 50 mm long and about 0.3 mm in external diameter.

The filaments, 30 filaments, were set in the tail portion of a toy animal having the shape of a horse, made of plastic.

The filaments turned wavy when wound around a finger and kept for 5 minutes as they were. The wavy state was retained for tens of minutes, and thereafter the wavy shape was gradually released until it was restored to the original straight state after leaving for several hours to a day.

The wavy filaments were also stretched straight and fixed to that shape, thereafter left to stand at 35° C. for 5 minutes and then left to stand at room temperature of 20° C., whereupon the filaments were restored to the initial straight state.

Example 14

400 parts of a polyamide type thermoplastic elastomer (trade name: DIAMID E62; available from Daicel-Huels Ltd.) as the thermoplastic resin (A) and 300 parts of polyester resin (trade name: ELITEL UE-3500; available from Unichika, Ltd.; glass transition temperature: 30° C.) as the thermoplastic polymer (B) were mixed, and the mixture obtained was melt-blended at by means of an extruder to obtain a thermoplastic resin composition.

Using a general-purpose melt spinning machine, the resin composition thus obtained was spinned, followed by drawing to obtain filaments of 250 mm long and about 2.5 mm in external diameter, used as the hair of a doll.

The filaments, 100 filaments, were put between metal wires, and the metal wires with the filaments were twisted to secure the hair to the metal wires. The resulting metal wires were secured to the head of the doll, and this head was joined to the body to make up a doll.

The above hair was wound on a hair curler of 9 mm in external diameter, and then kept at a room temperature of 25° C. for 5 minutes as it was. Thereafter, the curler was removed, whereupon the hair stood curled with the same inner diameter as the outer diameter of the curler. This state was retained for about tens of minutes, and thereafter the curl was gradually released until it was restored to the original straight state after leaving for several hours to a day.

Individual hairs did not tangle even when brushed.

In the state the hair was wound on the curler, it was heated in a 35° C. oven for 3 minutes. This was subsequently left to stand at room temperature of 20° C., and thereafter the curler was removed, whereupon the hair stood curled with the same inner diameter as the outer diameter of the curler, and this shape was retained so long as no external force was applied.

Next, the curled hair was stretched straight and fixed to that shape by means of a fixing tool. This hair was again heated in a 35° C. oven and thereafter left to stand at room temperature of 20° C., and then the fixing tool was removed, whereupon the hair was restored to the initial straight state.

The hair curled at 35° C. was also left to stand at room temperature of from 25° C. to 30° C., whereupon it was naturally restored to substantially the original straight state after leaving for several hours to a day.

Individual hairs did not tangle even when brushed.

The stress memory thermoplastic resin composition and stress memory temperature-dependent shape-transformable/fixable product of the present invention will be described below by giving Examples 15 to 17.

Example 15

A thermoplastic polyurethane elastomer (A) (trade name: DESMOPAN 385E; available from Bayer Japan Ltd.) and a saturated polyester resin (B) (trade name: POLYESTER TP-249; available from Nippon Gosei Sangyo Co., Ltd.; glass transition temperature: 36° C.) were melt-blended in a proportion (A)/(B) of 2/1 in weight ratio to obtain a thermoplastic resin composition, which was then continuously extruded from nozzles of an extruder to obtain filaments of 2 mm in diameter.

To a sample obtained by cutting the filaments in a length of 100 mm, a tensile stress was applied while heating at 50° C. to stretch the sample in a length of 250 mm. This was cooled to become shape-fixed at 20° C. or below, and thereafter again heated to 50° C., whereupon it contracted to become restored to the length of 100 mm.

The above elongation and contraction were both accompanied with rubber elasticity.

Example 16

A thermoplastic polyamide elastomer (A) (trade name: PEBAX 3533; available from Toray Industries, Inc.) and a thermoplastic acrylic resin (B) (trade name: DIANAL BR-117; available from Mitsubishi Rayon Co., Ltd.; glass transition temperature: 35° C.) were melt-blended in a proportion (A)/(B) of 2/1 in weight ratio to obtain a thermoplastic resin composition, which was then continuously extruded from nozzles of an extruder to obtain filaments of 2 mm in diameter.

To a sample obtained by cutting the filaments in a length of 100 mm, a tensile stress was applied while heating at 50° C. to stretch the sample in a length of 150 mm. This was cooled to become shape-fixed at 20° C. or below, and thereafter again heated to 50° C., whereupon it contracted to become restored to the length of 100 mm.

The above elongation and contraction were both accompanied with rubber elasticity.

Example 17

The material obtained by melt-blending the thermoplastic polyurethane elastomer (A) and saturated polyester resin (B) of Example 15 was applied in joint members having the function of knee joints, leg joints and hip joints of plastic toy dolls used in a bath to play with. Thus, it was possible to make up toy dolls having the function to play with while twisting or bending and stretching the corresponding portions by applying cold water and hot water (40° C.).

As described above, the thermoplastic resin composition of the present invention and the temperature-dependent shape-transformable/fixable product obtained using the same can be transformed to any desired shapes by applying a slight external stress by means of a tool, fingers or the like at a temperature within daily-life temperature or in a temperature region about it, or at environmental temperature ascribable to everyday heating and cooling means, and can be fixed to the transformed shape when cooled with water or left to stand naturally or by other cooling means.

The fixed shape can be released upon heating at a temperature higher than the glass transition temperature, and is shape-transformable/fixable arbitrarily to other shapes.

As described above, the shape-transformation takes place in a relatively low temperature region, and the transformed shape becomes fixed as a result of temperature drop to enable repetitive shape-transformation/fixation to the desired shapes, and hence the product can be applied in toys, stationery, teaching materials, decorations and other various fields in which shape-transformability is required.

Such composition and product obtained using it can be specifically effective as shape-transformable fiber for doll hair, which can be transformed to free hair styles with ease in a temperature region of from normal temperature to 70° C., and preferably in a temperature region of from 30° C. to 60° C., and the transformed hair style can be fixed by cooling. If desired, the hair style thus fixed can be restored to the original state or transformed to different hair styles, thus having repeating durability, and, e.g., infants can readily change the hair style to play with.

As another function attributable to the present invention, the product of the present invention is effective as a stress memory material, where the form set up at a temperature lower than the glass transition temperature undergoes elastic elongation and shape-transformation in conformity with external force upon application of the external force in a temperature region higher than the temperature about the glass transition temperature, and the form set up as a result of the shape-transformation is fixed in a temperature region lower than the glass transition temperature while holding as memory the elastic contraction stress which is a counterforce or reaction force of the stress of the elastic elongation. This fixed state is released when the elastic contraction stress is exhibited in a temperature region higher than the glass transition temperature and is restored to the original shape. As having such a function, the product of the present invention can be functioned as single-material shaped articles as a matter of course, and also can be applied as structure constituent members that effectively exhibit the above function.

Especially in a system having a glass transition temperature of from 30° C. to 60° C., the product of the present invention is preferred as toy elements, where everyday temperature means such as hot water, hair dryers and cold water can be used to utilize the elastic contraction stress exhibited at the time of shape-transformation and restoration to original shape. Thus, the product can be applied in variety as toy elements.

Those having the glass transition temperature in a minus temperature region can be applied to, e.g., means for detecting temperature histories and means for preventing temperature rise.

As additional advantages of the present invention, the materials themselves are combinations of general-purpose materials, promising a relatively low cost. Also, they can be well molded or shaped by injection molding or extrusion, and can make up various shaped articles according to purposes.

What is claimed is:

1. A thermoplastic resin composition comprising a melt-blend of a thermoplastic resin (A) having a melting point or softening point of 100° C. or above and at least one thermoplastic copolymer (B) having a glass transition temperature within the range of from −20° C. to 70° C., said resin composition having a weight ratio proportion (A)/(B) of from 95/5 to 20/80, the thermoplastic resin (A) being selected from the group consisting of a polyamide, a polyester and a thermoplastic elastomer, the thermoplastic polymer (B) being selected from the group consisting of a saturated polyester resin, an acrylate resin, a methacrylate resin, a vinyl acetate resin, an ethylene-vinyl acetate copolymer and a styrene resin, said composition being transformable to any shape that conforms to an external stress applied in a temperature region of from about the glass transition temperature of the thermoplastic resin copolymer (B) to the melting point thereof, and being capable of being fixed to said shape in a temperature region lower than said glass transition temperature.

2. The thermoplastic resin composition according to claim 1, wherein said thermoplastic resin (A) is a thermoplastic elastomer (a).

3. A stress memory thermoplastic resin composition comprising a melt-blend of a thermoplastic elastomer (a) and a thermoplastic copolymer (B) having a glass transition temperature within a range of from −20° C. to 70° C., said resin composition having a weight ratio proportion (a)/(B) of from 0.5/1–10/1, said composition being elastically transformable to any shape that conforms to a deforming stress applied in a temperature region of from about the glass transition temperature of the thermoplastic polymer (B) to the melting point thereof, and being fixable to the transformed shape in a temperature region lower than the glass transition temperature, said stress memory thermoplastic resin being further capable of exhibiting an elastic stress in a temperature region higher than the glass transition temperature to restore its original shape prior to said deforming stress.

4. The thermoplastic resin composition according to any of claims 2 or 3, wherein said thermoplastic elastomer (a) is selected from the group consisting of a polyamide, a polyurethane, a polystyrene, a polyolefin, a polybutadiene, a polyester and an ethylene-vinyl acetate copolymer.

5. The thermoplastic resin composition according to claim 4, wherein said thermoplastic resin polymer (B) is in a dispersed state, or in a mixed state of a dispersed state and a mutually molten state.

6. The thermoplastic resin composition according to claim 4, further comprising a reversibly thermochromic microcapsular pigment composition contained in a dispersed state.

7. A temperature-dependent shape-transformable/fixable product formed by a thermoplastic resin composition comprising a melt-blend of a thermoplastic resin (A) and one or more thermoplastic polymers (B) having a glass transition temperature within a range of from −20° C. to 70° C., said resin composition having a weight ratio proportion of (A)/(B)=95/5–20/80, said fixable product being transformable to any shape that conforms to an external stress applied in a temperature region of from about the glass transition temperature of the thermoplastic polymer (B) to the melting point thereof, and being fixed to said shape in a temperature region lower than said glass transition temperature.

8. The temperature-dependent shape-transformable/fixable product, according to claim 7, wherein the resin composition is transformable to a desired shape upon application of external force in a temperature lower than approximately 100° C., and said thermoplastic polymer (B) has a glass transition temperature within a range of from 20° C. to 70° C.

9. The temperature-dependent shape-transformable/fixable product according to claim 8, wherein said thermoplastic resin (A) is a thermoplastic elastomer (a) selected from the group consisting of a polyamide, a polyurethane, a polystyrene, a polyolefin, a polybutadiene, a polyester and an ethylene-vinyl acetate.

10. A deforming stress memory temperature-dependent shape-transformable/fixable product comprising a melt blend of a thermoplastic elastomer (a) and a thermoplastic polymer (B) having a glass transition temperature within a range of from −20° C. to 70° C., wherein said melt blend is elastically transformed to any shape that conforms to a deforming stress applied in a temperature region from the glass transition temperature of said thermoplastic polymer (B) to the melting point thereof, and is fixed to said shape in a temperature region below the glass transition temperature of said thermoplastic resin (B), said stress memory product being further capable of exhibiting from said fixed shape an elastic stress in a temperature region higher than said glass transition temperature of said melt blend so as to restore its original shape prior to said deforming stress.

11. The deforming stress memory temperature-dependent shape-transformable/fixable product according to claim 10, wherein said product is capable of undergoing elastic elongation to change its shape to conform to an external force applied at a temperature above the glass transition temperature, is fixed to the changed shape at a temperature region below the glass transition temperature of said thermoplastic resin (B), and retains an elastic contraction stress which is a reaction to said elastic elongation stress, said elastic contraction stress being exhibited in a temperature region higher than the glass transition temperature to release the fixed shape and restore its original shape prior to said deforming stress.

12. The deforming stress memory temperature-dependent shape-transformable/fixable product according to claim 11, wherein said product has a tensile elastic elongation of at least 100% and is capable of exhibiting an elastic contraction restoration stress having 80% or more of said tensile elastic elongation.

13. The temperature-dependent shape-transformable/fixable product according to claim 8, wherein said thermoplastic resin (A) is selected from the group consisting of a polyamide resin, a polyester resin and a thermoplastic elastomer (a); and said thermoplastic polymer (B) is a polymer selected from the group consisting of a saturated polyester resin, an acrylate resin, a methacrylate resin, a vinyl acetate resin and an ethylene-vinyl acetate copolymer.

14. The temperature-dependent shape-transformable/fixable product according to any of claims 7 to 13, wherein said product is a shaped article in the form of a sheet or a filament.

15. The temperature-dependent shape-transformable/fixable product according to claim 14, wherein said product is in the form of a filament having an outer diameter of from 0.2 mm to 3 mm.

16. A doll hair fiber, comprising a temperature-dependent shape-transformable/fixable product which comprises a melt blend of a thermoplastic resin (A) and one or more thermoplastic polymers (B) having a glass transition temperature within a range of from 0° C. to 70° C., said melt blend having a weight ratio proportion of (A)/(B)=95/5–20/80, the hair fiber having an outer diameter of from 30 μm to 200 μm.

17. The stress temperature-dependent shape-transformable/fixable product according to claim 10, wherein said thermoplastic elastomer (a) is a polyurethane elastomer, and said thermoplastic polymer (B) is a saturated polyester resin.

18. The temperature-dependent shape-transformable/fixable product according to claim 10 or 13, wherein said thermoplastic elastomer (a) is a polyamide elastomer and said thermoplastic polymer (B) is a saturated polyester resin having a glass transition temperature of from 0° C. to 50° C.; said saturated polyester resin being contained in an amount of from 5 to 80 parts by weight based on the total weight of the resins.

19. The temperature-dependent shape-transformable/fixable product according to claim 14, which further comprises a reversibly thermochromic layer formed on an external area of the product and capable of causing a visual color change seen concurrently with the shape-transformation of the product.

20. The temperature-dependent shape-transformable/fixable product according to claim 14, wherein said product is a toy or a decorative element.

* * * * *